June 5, 1923.
P. J. SHRUM
THREAD PROTECTOR
Filed June 9, 1919
1,457,882
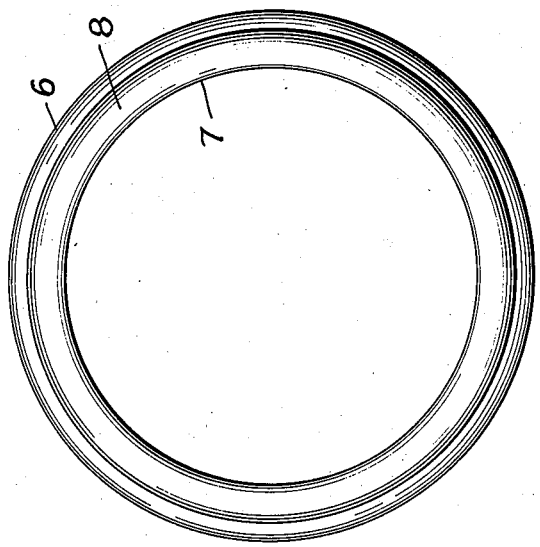
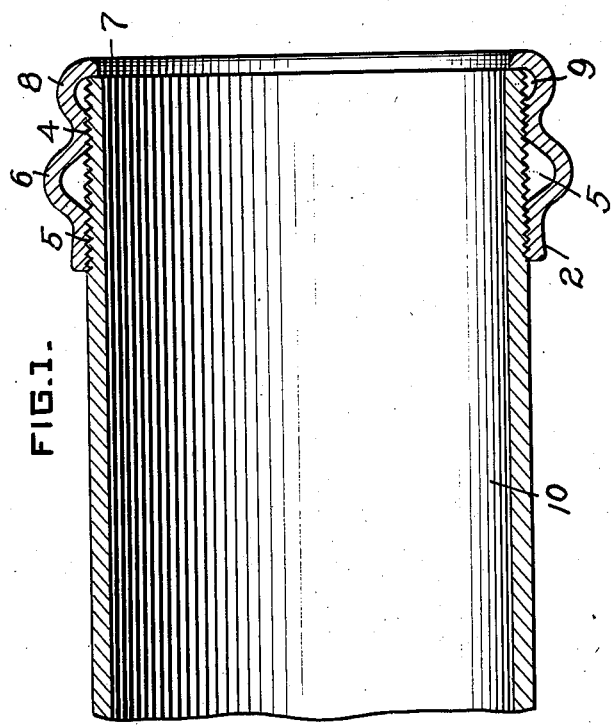
WITNESSES
INVENTOR Patented June 5, 1923.

1,457,882

UNITED STATES PATENT OFFICE.

PETER J. SHRUM, OF MONACO HEIGHTS, PENNSYLVANIA, ASSIGNOR TO COLONA MANUFACTURING COMPANY, OF PITTSBURGH, PENNSYLVANIA, A CORPORATION OF PENNSYLVANIA.

THREAD PROTECTOR.

Application filed June 9, 1919. Serial No. 302,952.

*To all whom it may concern:*

Be it known that I, PETER J. SHRUM, a citizen of the United States, residing at Monaco Heights, in the county of Beaver and State of Pennsylvania, have invented certain new and useful Improvements in Thread Protectors, of which the following is a specification.

My invention consists in an improvement in thread protectors and has for its object to provide a device of this class formed of a continuous integral ring provided with interior securing threads, a terminal retaining annular lip or flange, and one or more laterally extending reinforcing or bracing members, as more fully hereinafter described.

The protector consists of a sleeve having separated series of securing threads with an intervening clearance space co-extensive with the outwardly projecting annular reinforcing member, and preferably also having a supplemental similar portion adjacent to the terminal retaining lip. The device is preferably constructed of a single integral ring which may be made of an ordinary pipe coupling or other suitable blank and of sufficient strength and resisting capacity to properly engage and protect the threaded end of a pipe when used as intended.

In the drawing which illustrates one preferred embodiment of the invention,

Fig. 1 is a longitudinal sectional view through the threaded end portion of a pipe provided with a protector as applied;

Fig. 2, an outer end view of the protector; and

Fig. 3, an enlarged sectional detail view showing the device as applied and of substantially full size.

The main body portion of the protector consists of an annular band 2 of metal, preferably iron or steel, having its interior threaded at intervals as indicated at 3 and 4 respectively, at each side of an intervening clearance opening 5. Such clearance opening is formed by an annular enlargement 6 of the ring, providing a strong reinforcing member about midway of its length, suitably rounded in the operation of manufacture so as to present a laterally projecting supporting or bracing annular rim.

The outer end of the protector extends inwardly beyond the threaded portions by an inwardly turned terminal lip or flange 7, which preferably forms the terminal end portion of a secondary outwardly arching bracing rim member 8. By such construction I provide a supplemental clearance portion 9 so that the threaded portions 3 and 4, as shown, engage portions only of the entire threaded part of the pipe 10, when screwed thereupon, up to the limit of movement and with the lip 7 engaging tightly against the outer end of the pipe.

The advantages of such construction are that the operation of screwing the protector upon the threaded pipe is facilitated and ample threaded engagement is ensured to effect positive holding connection between the parts. Also, the protector itself by its main annular reinforcing rim 6, and, when used, the supplemental rim 8 constitute strong protecting and bracing portions which increase the effective strength of the protector itself and ensure against possible contact of any portion of the pipe threads from damaging contact with any adjacent body or surface even when the protector is not properly applied.

In construction, the device is formed of an ordinary straight ring blank which is first wedged down in suitable dies lengthwise to produce the annular projecting ring portions above described, with the intervening clearance spaces and the inwardly extending terminal lip or flange 7. The blank as thus formed is then tapped by a continuous threading tool to cut the segregated series of threads 3 and 4 which are thereby adapted to continuous screwing upon the threads of the pipe to be protected.

By reason of its reinforcing characteristics, I am enabled to make the protector of metal of minimum gauge or thickness due to its strengthening annular members, with corresponding economy. The device may be made in any desired size or dimensions; it is very strong and durable, well adapted to the purposes in view, and capable of repeated use.

It will be understood that if desired the inner threaded portion 4 may continue straight out to the terminal of the protector, avoiding the supplemental reinforcing ring portion 8 and clearance space 9, with the terminal lip 7 extending abruptly inwardly and with the single annular rib 6, as will be readily understood. Such change, or other detail variations or modifications may be made by the skilled mechanic, but all such are to be considered as within the scope of the following claims.

What I claim is:

1. A thread protector comprising a rigid continuous annular blank having an inwardly turned retaining lip at one end, said blank having an outwardly bent rib thereon which forms an annular interior channel, and a relatively wide interiorly threaded portion adjacent each side of the channel.

2. A thread protector comprising an integral metal blank in the form of a continuous annular sleeve having an inwardly turned lip at one end thereof, an outwardly bent annular rib beginning at said lip and extending to a point intermediate the ends of the blank, said rib forming an annular interior channel, a second larger annular rib disposed intermediate the ends of the protector and forming a second interior channel, an interiorly threaded portion between the two inner channels, and an annular flat portion extending from the larger rib to the opposite end of the sleeve having threads formed on the interior thereof.

In testimony whereof I hereunto affix my signature.

PETER J. SHRUM.